Nov. 1, 1932.     F. A. BEATTY     1,885,320
AUTOMATIC CENTERING AND SHEARING MACHINE
Filed March 28, 1931     3 Sheets-Sheet 3

INVENTOR
Floyd A. Beatty
by Byrnes, Stebbins, Parmelee & Blenko
his attorneys

Patented Nov. 1, 1932

1,885,320

UNITED STATES PATENT OFFICE

FLOYD A. BEATTY, OF CORLISS STATION, PENNSYLVANIA, ASSIGNOR TO LEWIS FOUNDRY & MACHINE COMPANY, OF GROVETON, PENNSYLVANIA, A CORPORATION OF PENNSYLVANIA

AUTOMATIC CENTERING AND SHEARING MACHINE

Application filed March 28, 1931. Serial No. 525,927.

This invention relates to the handling and shearing of sheets, more particularly sheets of metal. It is often desirable to shear sheets, strips, and the like in the center of the sheet so as to obtain two sections of equal area. Where the sheets are not always of exactly the same dimensions, it is not convenient to provide guides for centering the sheets beneath the shears.

Accordingly, one object of my invention is to provide an arrangement for handling and shearing sheets which are to be cut or sheared into equal sections. A further object of my invention is to provide conveying and centering equipment for bringing sheets to a shearing machine, centering the sheets, and then conveying the sheets away from the shearing machine. Other objects will become apparent in the course of the ensuing description and will be more particularly pointed out in the accompanying claims.

In the drawings in which, for purposes of illustration and not as limiting my invention, I have shown one embodiment which the same may assume, Figure 1 is a plan view of conveying and centering apparatus embodying my invention. In this figure the shearing apparatus is omitted to make clearer the arrangement of the remainder of the apparatus;

Figure 1:
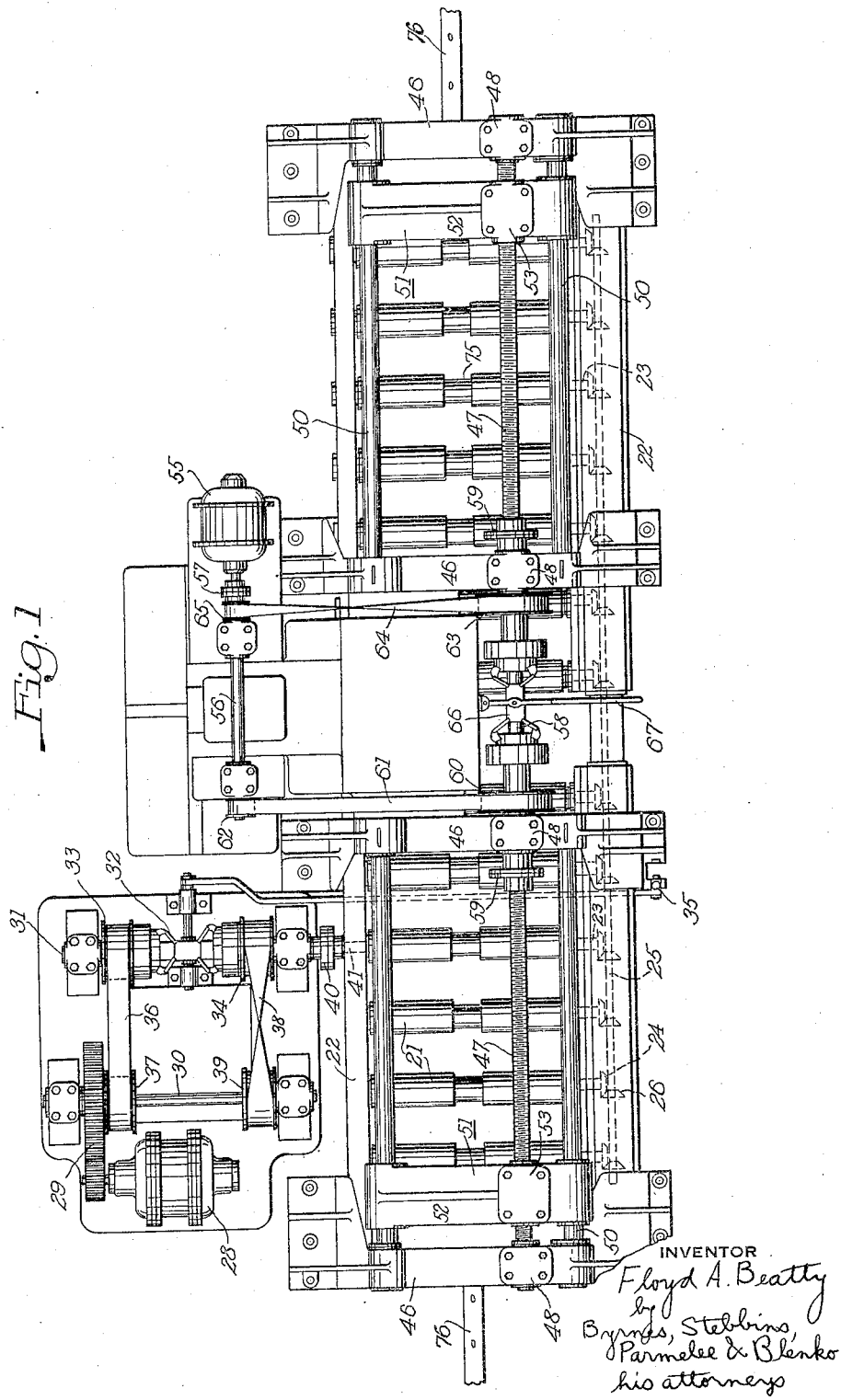

In general, the apparatus includes shearing apparatus, means for conveying the sheets or other material to be sheared, and pushing devices which may be caused to engage the material and push the same into shearing position. The shearing apparatus is shown in the drawings as comprising a pedestal block 5 carrying the lower cutter element, this element being stationary. The upper cutter element 6 is carried by a reciprocable shear member 7. Reciprocation of the member 7 is brought about by an eccentric 8 on the main shaft 9 of the shear. A clutch 10, controlled by mechanism 11 including a treadle 12, is provided for connecting and disconnecting the large gear 13 with the main shaft 9. A motor 15 mounted on the frame of the shear drives a large gear 16 on a jack-shaft 17 through a pinion 18. The jack-shaft 17 carries a pinion 19 which meshes with the large gear 13; and, therefore, when the clutch 10 is engaged, the cutting element 6 carried by the member 7 is reciprocated through the actuation by the motor 15.

Figure 2:
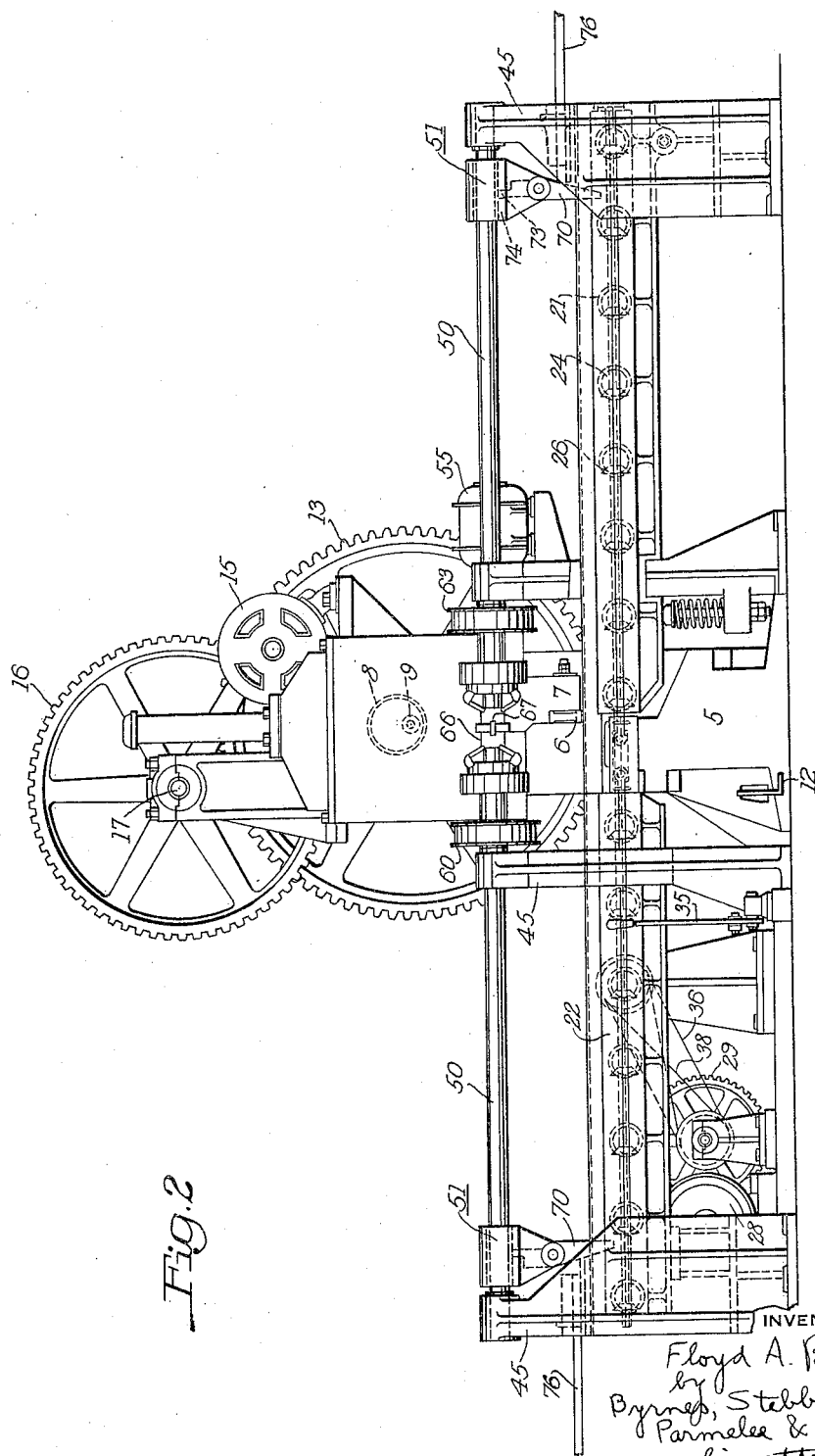
Figure 2 is a view in elevation of combined shearing, conveying, and centering mechanism embodying my invention.
Figure 3:
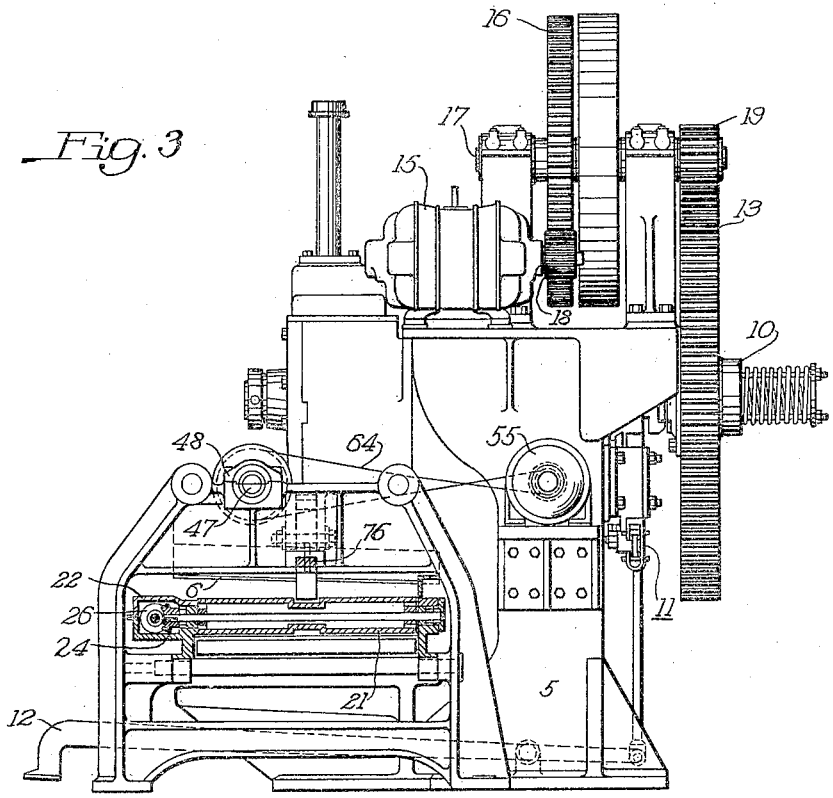
Figure 3 is a view in end elevation of the mechanism shown in Figure 2.

The material to be sheared is brought to the shearing apparatus by conveying means adapted to permit sliding of the sheets or the like over the same. In accordance with the broader aspect of my invention, the conveying means may bring the material to the shear from the front or at any desired angle; but in the preferred embodiment of my invention I introduce the material from the side of the shearing apparatus. In this preferred embodiment, the conveying means comprises rotatable elements such as rollers 21 suitably journaled in a frame 22. The front ends of the shafts 23 of the rollers 21 carry mitre gears 24. A transverse shaft 25 extends across the conveying means in the frame 22 and connects all of the rollers 21 for simultaneous rotation, this transverse shaft 25 having mitre gears 26 meshing with the mitre gears 24. In order to drive the elements 21, I provide a motor 28 connected through reduction gear 29 to a jack-shaft 30. A shaft 31 parallel to the shaft 30 is provided with clutch mechanism 32, whereby either a belt pulley 33 or a belt pulley 34 may be attached thereto to drive the same. This clutch mechanism 32 is controlled by a lever 35 at the operator's position at the front of the machine (see Figures 1 and 2). The pulley 33 is arranged to be driven by a belt 36 passed about a belt pulley 37 secured to the shaft 30. The pulley 34 is arranged to be driven in reverse direction by a belt 38 passed about a belt pulley 39 on the shaft 30. It is, accordingly, apparent that by shifting the lever 35 rearwardly or forwardly the shaft 31 may be driven in either direction. The shaft 31 is connected by a flexible coupling 40 to the extended end 41 of the shaft 23 of one of the elements 21. Since all of the elements 21 are connected together for simultaneous rotation, the lever 35 controls the rotation and also the direction of rotation of these elements 21. The sheets or other material may, therefore, be introduced at one end or the other of the frame 22, preferably the left end, as shown in Figure 1, and may be passed through the apparatus, stopped at any desired position, and then delivered at the other end of the frame 22. Under certain circumstances, it might be desirable to introduce the material at one end of the frame 22, shear the material, and return the sheared sections to the same end of the frame 22. This is possible since the direction in which the shaft 31 is driven may be reversed.

It is practically impossible to so jog the clutch mechanism 32 as to position a sheet beneath the cutter element 6 of the shear so as to bring about a severing of the sheet into two equal halves. Accordingly, I have provided positioning means which engages the sheet and positions the same relative to the cutter element 6 automatically. This positioning means need not be adjusted for each change in the size of the sheets being severed, as the same accurately positions the sheets automatically irrespective of the size of the sheet. The positioning means is carried by standards 45 extending upwardly from the frame 22. Cross members 46 provide bearings 48 for rotatable screws 47, one on each side of the shearing apparatus. Guides 50 extend transversely between the standards 45 and a pair of engaging means 51 are slidably mounted on the guides 50. Each means 51 comprises a cross frame 52 having a bore at each end for receiving the guides 50 so that the cross frame may slide transversely on the guides 50. The cross frame 52 also comprises a nut 53 whose threads engage the screw 47. One screw 47 is right-hand and the other screw is left-hand, so that when rotated simultaneously the screws move the cross frames 52 toward or away from each other. A motor 55 drives a shaft 56 through a flexible coupling 57. A shaft 58 is arranged intermediate the screws 47 and coaxial therewith. This shaft is connected to the screws 47 by flexible couplings 59. A belt pulley 60 is rotatably mounted on the shaft 58 and is driven from the shaft 56 by a belt 61 and belt pulley 62 secured to the shaft 56. A belt pulley 63 is rotatably mounted on the shaft 58 and arranged to be driven in the reverse direction by a reversing belt 64 driven from the shaft 56 by a belt pulley 65 secured thereto. Clutch mechanism 66 is arranged intermediate the pulleys 60 and 63 so as to connect one or the other to the shaft 58 to drive the same. It is, accordingly, apparent that, when the lever 67 of the clutch mechanism 66 is shifted in one direction, the pair of screws 47 are rotated in one direction; and, when the lever 67 is shifted to its opposite position, the screws 47 are rotated in the opposite direction. In its middle position the clutch mechanism is disengaged from both pulleys 60 and 63 and the screws 47 remain stationary.

Figure 4:
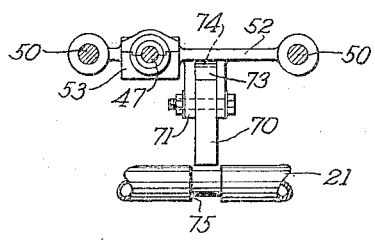
Figure 4 is a detail view showing one of the trip dogs.

As shown more particularly in Figure 4, a dog 70 is pivotally mounted in brackets 71 depending from each cross frame 52. The dog 70 is provided with a heel 73 for engaging an abutment 74 in the cross frame 52. Accordingly, the dog 70, shown at the right end of Figure 2, may swing freely in a clockwise direction but can not swing beyond the position shown in Figure 2 in counterclockwise direction. The rotatable elements 21 are grooved at 75 so as to permit the lower ends of the dogs 70 to pass transversely and push the sheets relative to the rollers 21 without hitting the latter. The two screws 47 rotate simultaneously and, therefore, the dogs 70 move inwardly simultaneously. As they are positioned on opposite sides of the sheet which is to be sheared, one or the other will engage the edge of the sheet and push the same over the rollers 21 until both dogs are in engagement with opposite edges of the sheet. At this time, the driving means for the shaft 58, which include a friction drive such as the belt and pulley drive shown in Figure 1, slips. The operator stops the rotation of shaft 56 as promptly as possible, attempting to stop the motor 55 immediately upon engagement of the sheet to be sheared by both dogs 70. The friction drive takes care of the slight interval between the time such engagement takes place and the time when the operator is able to stop rotation of the shaft 56. After the sheet has been centered relative to the shearing apparatus, the direction of rotation of the shaft 58 is reversed by shifting the lever 67 to its opposite position. This carries the cross frames 52 outwardly; and toward the end of their travel one or both of the dogs 70 is engaged by a trip 76. This trip extends through an opening in the cross brace 46. The trip may be adjusted inwardly or outwardly to different positions so as to trip the dog 70 and swing the same to retracted position when the cross frame 52 has been moved outwardly the desired amount. The dog 70 is free to swing inwardly about its pivot; and, therefore, the trip 76 is positioned so as to engage the dog 70 below its pivot. When the dog 70 has thus been automatically swung to retracted position, the rotatable elements 21 may be driven so as to convey the severed sections out beneath the dog 70.

The operation of my improved centering and shearing machine is believed to be apparent from the above description. The sheets or the like which are to be severed are placed upon the conveying means and carried toward shearing position by suitable operation of the clutch mechanism 32. The actuation of the conveying mechanism may then be discontinued. The centering means is then set in operation so as to rotate the screws 47 in the proper direction to advance the dogs 70 toward each other. As soon as both dogs are in engagement with opposite edges of the sheet or other material, the clutch mechanism 66 is moved to neutral position. The treadle 12 is then operated to bring about shearing of the sheet. The cross frames 52 may be moved away from each other either before or after the shearing operation. When the cross frames 52 approach the outer end of their travel, the trips 76 move one or both dogs to retracted position. The conveying means 21 may then be driven to move the severed sections of the sheet out of the frame 22 beneath the retracted dog 70.

It will be apparent that my centering and shearing machine automatically centers not only sheets but any other type of material which it might be desired to shear into two pieces of the same length. Conveying and centering is easily controlled by one operator and the passage of the severed sections out of machine is automatic once the conveying means has been set in operation. It is not necessary to transfer the sheets manually from one conveyor to another at any point; and the material passes through the mechanism in a straight line, entering at one point and passing out from the other side of the machine if desired.

While I have illustrated and described certain specific forms of conveying apparatus, centering apparatus, and shearing apparatus, it will be understood that the invention is not restricted to the particular construction and arrangement shown but may be variously modified within the contemplation of the invention and under the scope of the following claims.

I claim:

1. In combination, shearing apparatus, conveying means for material to be sheared, material engaging members movable longitudinally of said conveying means toward shearing position from opposite sides of shearing position, and means for simultaneously moving said members toward shearing position to center the material relative to said shearing apparatus.

2. In combination, shearing apparatus, conveying means comprising a plurality of conveying rollers for conveying material toward shearing position and means for driving said conveying rollers, and means movable longitudinally relative to said conveying means for engaging said material and sliding the same relative to said rollers into shearing position.

3. In combination, shearing apparatus, conveying means comprising a plurality of conveying rollers for conveying material to be sheared, material engaging members movable longitudinally of said conveying means toward shearing position from opposite sides of shearing position, and means for simultaneously moving said members to center the material in shearing position.

4. In combination, shearing apparatus, conveying means comprising a plurality of conveying rollers, and means for driving said conveying rollers, and means movable longitudinally of the conveying means for engaging material on the conveying rollers and sliding the same relative to the rollers into shearing position.

5. In combination, shearing apparatus, a support for the material to be sheared, material engaging members movable longitudinally of said support toward shearing position from opposite sides thereof, and means for simultaneously moving said members to center the material in shearing position.

6. In combination, shearing apparatus, conveying means for supporting and conveying material to shearing position, members movable longitudinally of said conveying means toward shearing position from opposite sides thereof, said members being adapted to marginally engage the material on the conveying means, and means for simultaneously moving said members to center the material in shearing position.

7. In combination, shearing apparatus, means comprising rotatable elements and actuating means for rotating said elements in either direction selectively for conveying material from either side toward shearing position, and means movable toward shearing position from opposite sides thereof for engaging said material and sliding the same over the rotatable elements into shearing position.

8. In combination, shearing apparatus, conveying means for material to be sheared, and positioning means cooperating with said conveying means to center the material in shearing position, said positioning means comprising opposed members for engaging material on the conveying means, and means for simultaneously moving said members longitudinally of said conveying means from opposite sides toward shearing position.

9. In combination, shearing apparatus, conveying means for material to be sheared, and positioning means cooperating with said conveying means to center the material in shearing position, said positioning means comprising opposed pivoted dogs for marginally engaging the material on the conveying means, and means for simultaneously moving said dogs toward shearing position.

10. In combination, shearing apparatus, conveying means for material to be sheared, positioning means above the conveying means and movable toward shearing position from opposite sides thereof, said positioning means comprising pivoted dogs for engaging opposite sides of the material on the conveying means, and means comprising friction driving means for moving said positioning means.

11. In combination, shearing apparatus, conveying means for material to be sheared, and positioning means cooperating therewith to center the material in shearing position, said positioning means comprising opposed pivoted dogs for marginally engaging the material, means for simultaneously moving said dogs longitudinally of said conveying means toward and from shearing position, and means engageable by a dog when moved away from shearing position to swing the dog into retracted position.

12. In combination, shearing apparatus, means for conveying material to be sheared comprising rotatable elements and means for rotating said elements, and positioning means cooperating with said conveying means to center the material in shearing position, said positioning means comprising opposed pivoted dogs for marginally engaging the material, means for simultaneously moving said dogs longitudinally of said conveying means toward and from shearing position and an abutment engageable by a dog when moved away from shearing position for swinging the dog into retracted position.

13. In combination, shearing apparatus, conveying means for material to be sheared, and positioning means cooperating therewith to center the material in shearing position, said positioning means comprising a pair of movable supports disposed on opposite sides of said shearing apparatus, means for simultaneously moving said supports toward and from shearing position, a pivoted dog carried by each support for marginally engaging material on said conveying means and an abutment projecting into position to be engaged by a dog when the support carrying the dog is moved away from shearing position whereby the dog is swung into retracted position to permit material to pass thereunder along said conveying means.

14. In combination, shearing apparatus, means comprising rotatable elements for conveying material to be sheared, and positioning means cooperating with said conveying means to center the material in shearing position, said positioning means comprising opposed members for engaging material on the rotatable elements and means for simultaneously moving said members longitudinally of said conveying means from opposite sides toward shearing position.

15. In combination, shearing apparatus, means comprising rotatable elements for conveying material to be sheared, and positioning means cooperating with said conveying means to center the material in shearing position, said positioning means comprising a pair of movable supports disposed on opposite sides of shearing position, means for simultaneously moving said supports longitudinally of said conveying means toward shearing position, and a pivoted dog carried by each support for marginally engaging material on said conveying means.

In testimony whereof I have hereunto set my hand.

FLOYD A. BEATTY.